(12) United States Patent
Chandrasekher et al.

(10) Patent No.: US 11,483,109 B2
(45) Date of Patent: Oct. 25, 2022

(54) SYSTEMS AND METHODS FOR MULTI-DEVICE COMMUNICATION

(71) Applicant: Aira Technologies, Inc., Saratoga, CA (US)

(72) Inventors: Anand Chandrasekher, Saratoga, CA (US); Ravikiran Gopalan, Cupertino, CA (US); Sandeep Kesireddy, San Jose, CA (US)

(73) Assignee: Aira Technologies, Inc., Saratoga, CA (US)

( * ) Notice: Subject to any disclaimer, the term of this patent is extended or adjusted under 35 U.S.C. 154(b) by 0 days.

(21) Appl. No.: 17/558,146

(22) Filed: Dec. 21, 2021

(65) Prior Publication Data

US 2022/0209909 A1 Jun. 30, 2022

Related U.S. Application Data

(60) Provisional application No. 63/131,236, filed on Dec. 28, 2020.

(51) Int. Cl.
*H04L 12/28* (2006.01)
*H04L 5/00* (2006.01)
*H04J 1/16* (2006.01)

(52) U.S. Cl.
CPC .......... *H04L 5/0044* (2013.01); *H04L 5/0048* (2013.01)

(58) Field of Classification Search
CPC ... H04L 5/0044; H04L 12/28; H04L 65/1069; H04L 45/74; H04L 69/22; H04L 2212/00; H04W 84/12
USPC ........................ 370/252, 329, 389
See application file for complete search history.

(56) References Cited

U.S. PATENT DOCUMENTS

| | | | |
|---|---|---|---|
| 5,657,325 A | 8/1997 | Lou | |
| 5,910,182 A | 6/1999 | Dent | |
| 5,968,197 A | 10/1999 | Doiron | |
| 6,418,549 B1 | 7/2002 | Ramchandran | |
| 6,505,253 B1 | 1/2003 | Chiu | |
| 6,523,068 B1 * | 2/2003 | Beser ...................... | H04L 61/00 709/245 |
| 7,016,658 B2 | 3/2006 | Kim et al. | |
| 7,124,205 B2 | 10/2006 | Craft et al. | |

(Continued)

FOREIGN PATENT DOCUMENTS

CN 106487610 A 3/2017
GB 2493081 A 1/2013

OTHER PUBLICATIONS

Kim et al., "Deepcode: Feedback Codes via Deep Learning," [online] Jul. 2, 2018 [retrieved on Apr. 17, 2020], Retrieved from the Internet: < URL:https://arxiv.org/abs/1807.00801v1>, 24 pages.

(Continued)

*Primary Examiner* — John Pezzlo
(74) *Attorney, Agent, or Firm* — Carr & Ferrell LLP

(57) ABSTRACT

Systems and methods for multi-device communication are disclosed herein. An example method includes generating a nested data packet including a first access address and a first payload, the first payload including a first target payload and a first payload nesting section, the first access address being assigned to a first device, a second access address and a second payload placed into the first payload nesting section, and transmitting the nested data packet to the first device and the second device.

21 Claims, 6 Drawing Sheets

(56) References Cited

U.S. PATENT DOCUMENTS

| | | | |
|---|---|---|---|
| 7,447,234 B2 | 11/2008 | Colas et al. | |
| 7,664,883 B2 | 2/2010 | Craft et al. | |
| 7,848,350 B1 | 12/2010 | Inamdar | |
| 7,971,131 B1 | 6/2011 | Ordentilch | |
| 8,223,643 B1 | 7/2012 | Wolfgang | |
| 8,305,963 B1* | 11/2012 | Breau | H04W 76/12 370/328 |
| 8,327,232 B2 | 12/2012 | Budampati et al. | |
| 8,352,830 B2 | 1/2013 | Landschaft et al. | |
| 8,437,267 B2 | 5/2013 | Amir et al. | |
| 8,473,821 B2 | 6/2013 | Taghavi Nasrabadi et al. | |
| 8,693,406 B2* | 4/2014 | Ahmadi | H04B 7/2612 370/473 |
| 8,990,663 B2 | 3/2015 | Liu et al. | |
| 10,270,564 B2 | 4/2019 | Djuklc et al. | |
| 10,491,569 B1 | 11/2019 | Powell | |
| 10,749,594 B1 | 8/2020 | O'Shea et al. | |
| 11,088,784 B1 | 8/2021 | Gopalan et al. | |
| 11,191,049 B1 | 11/2021 | Chandrasekher et al. | |
| 2001/0030954 A1 | 10/2001 | Hameleers | |
| 2002/0026523 A1 | 2/2002 | Mallory et al. | |
| 2002/0054608 A1 | 5/2002 | Wan | |
| 2002/0122510 A1 | 9/2002 | Yakhnich et al. | |
| 2003/0215029 A1 | 11/2003 | Limberg | |
| 2004/0170120 A1 | 9/2004 | Reunamaki et al. | |
| 2005/0094561 A1 | 5/2005 | Raaf | |
| 2005/0208897 A1 | 9/2005 | Lyons | |
| 2006/0021040 A1* | 1/2006 | Boulanger | H04L 63/1416 726/23 |
| 2006/0047862 A1 | 3/2006 | Shearer et al. | |
| 2006/0268996 A1 | 11/2006 | Sethi et al. | |
| 2007/0168197 A1 | 7/2007 | Vasilache | |
| 2008/0002688 A1 | 1/2008 | Kim et al. | |
| 2008/0002790 A1 | 1/2008 | Itoh | |
| 2008/0126824 A1 | 5/2008 | Lee et al. | |
| 2008/0225735 A1 | 9/2008 | Qiu | |
| 2008/0250299 A1 | 10/2008 | Maillet et al. | |
| 2009/0086711 A1 | 4/2009 | Capretta et al. | |
| 2009/0119566 A1 | 5/2009 | Hiromitsu | |
| 2009/0276686 A1 | 11/2009 | Liu et al. | |
| 2010/0037270 A1 | 2/2010 | Bennet | |
| 2010/0165868 A1 | 7/2010 | Gersemsky | |
| 2010/0192175 A1 | 7/2010 | Bachet | |
| 2010/0202416 A1 | 8/2010 | Wilhelmsson et al. | |
| 2010/0262885 A1 | 10/2010 | Cheng | |
| 2011/0131461 A1 | 6/2011 | Schulz | |
| 2011/0206019 A1 | 8/2011 | Zhai et al. | |
| 2011/0206065 A1 | 8/2011 | Kim et al. | |
| 2011/0216787 A1 | 9/2011 | Ai et al. | |
| 2012/0300642 A1 | 11/2012 | Abel et al. | |
| 2013/0018889 A1 | 1/2013 | Jagmohan | |
| 2013/0132786 A1 | 5/2013 | Tanigawa et al. | |
| 2013/0223203 A1 | 8/2013 | Bai | |
| 2013/0250179 A1 | 9/2013 | Lida | |
| 2013/0339036 A1 | 12/2013 | Baeckstroem et al. | |
| 2014/0140342 A1 | 5/2014 | Narad | |
| 2014/0241309 A1 | 8/2014 | Hilton et al. | |
| 2015/0009902 A1 | 1/2015 | Emmanuel | |
| 2016/0006842 A1 | 1/2016 | Tahir | |
| 2016/0062954 A1 | 3/2016 | Ruff | |
| 2016/0254881 A1 | 9/2016 | Meylan | |
| 2016/0261375 A1* | 9/2016 | Roethig | H04L 1/0083 |
| 2017/0006616 A1 | 1/2017 | Singh et al. | |
| 2017/0012799 A1* | 1/2017 | Jiang | H04L 45/24 |
| 2017/0269876 A1 | 9/2017 | Mukhopadhyay et al. | |
| 2018/0013808 A1 | 1/2018 | Petry et al. | |
| 2018/0048567 A1 | 2/2018 | Ignatchenko | |
| 2018/0101957 A1 | 4/2018 | Talathi | |
| 2018/0267850 A1 | 9/2018 | Froelich et al. | |
| 2018/0288198 A1 | 10/2018 | Pope et al. | |
| 2018/0314985 A1 | 11/2018 | O'Shea | |
| 2018/0359811 A1 | 12/2018 | Verzun et al. | |
| 2019/0028237 A1 | 1/2019 | Pan et al. | |
| 2019/0037052 A1 | 1/2019 | Deshpande | |
| 2019/0097680 A1 | 3/2019 | O'Brien | |
| 2019/0097914 A1 | 3/2019 | Zhong et al. | |
| 2019/0392266 A1 | 12/2019 | Zhong et al. | |
| 2019/0393903 A1 | 12/2019 | Mandt et al. | |
| 2020/0128279 A1 | 4/2020 | Han et al. | |
| 2020/0177418 A1 | 6/2020 | Hoydis et al. | |
| 2020/0213152 A1* | 7/2020 | Choquette | H04L 63/029 |
| 2020/0320371 A1 | 10/2020 | Baker | |
| 2020/0383169 A1 | 12/2020 | Takahashi et al. | |
| 2021/0014939 A1 | 1/2021 | Verzun et al. | |
| 2021/0034846 A1 | 2/2021 | Ko et al. | |
| 2021/0056058 A1 | 2/2021 | Lee et al. | |
| 2021/0120440 A1 | 4/2021 | Reimann et al. | |
| 2021/0319286 A1 | 10/2021 | Gunduz | |
| 2021/0392033 A1 | 12/2021 | Haartsen | |
| 2022/0045696 A1 | 2/2022 | Boussard | |
| 2022/0114436 A1 | 4/2022 | Gopalan et al. | |

OTHER PUBLICATIONS

Gopalan et al., "Systems and Methods for Artificial Intelligence Discovered Codes", U.S. Appl. No. 17/069,794, filed Oct. 13, 2020, Specification, Claims, Abstract, and Drawings, 43 pages.

Goutay et al., "Deep reinforcement learning autoencoder with noisy feedback." 2019 International Symposium on Modeling and Optimization in Mobile, Ad Hoc, and Wireless Networks (WiOPT). IEEE, Jun. 24, 2019, 6 pages.

Yamamoto et al., "Application of Yamamoto-Itoh coding scheme to discrete memoryless broadcast channels." 2017 IEEE International Symposium on Information Theory (ISIT). IEEE, 2017, 5 pages.

Aoudia et al., "End-to-end learning of communications systems without a channel model." 2018 52nd Asilomar Conference on Signals, Systems, and Computers. IEEE, Dec. 5, 2018, 6 pages.

Duman et al., "On optimal power allocation for turbo codes." Proceedings of IEEE International Symposium on Information Theory. IEEE, Jun. 29-Jul. 4, 1997, 1 page.

Arvinte et al., "Deep log-likelihood ratio quantization." 2019 27th European Signal Processing Conference (EUSIPCO). IEEE, 2019, 5 pages.

"International Search Report" and "Written Opinion", Patent Cooperation Treaty Application No. PCT/US2021/054265, dated Nov. 24, 2021, 24 pages.

"International Search Report" and "Written Opinion", Patent Cooperation Treaty Application No. PCT/US2021/063356, dated Jan. 14, 2022, 9 pages.

Henze, Martin, "A Machine-Learning Packet-Classification Tool for Processing Corrupted Packets on End Hosts", Diploma Thesis, Chair of Communication and Distributed Systems, RWTH Aachen University, Mar. 2011, 103 pages.

Kötter et al., "Coding for Errors and Erasures in Random Network Coding", IEEE Transactions on Information Theory 54.8; 3579-3591. Mar. 25, 2008; Retrieved on Feb. 19, 2022 (Feb. 19, 2022) from <https://arxiv.org/pdf/cs/0703061.pdf> entire document; 30 pages.

Grcar, Joseph, "How ordinary elimination became Gaussian elimination", Historia Mathematica vol. 38 Issue 2, May 2011; Available online Sep. 28, 2010; pp. 163-218.

* cited by examiner

SYSTEMS AND METHODS FOR MULTI-DEVICE COMMUNICATION

CROSS REFERENCE TO RELATED APPLICATIONS

This application claims the benefit and priority of U.S. Patent Application Ser. No. 63/131,236, filed on Dec. 28, 2020, which is hereby incorporated by reference herein in its entirety, including all references and appendices cited therein.

FIELD OF INVENTION

This disclosure pertains to multi-device communication, and more particularly, but not by way of limitation, to systems and methods that utilize multi-address data packets to communicate with multiple devices.

SUMMARY

In one embodiment, the present disclosure is directed to a method comprising generating a nested data packet comprising a first access address and a first payload, the first payload comprising a first target payload and a first payload nesting section, the first access address being assigned to a first device, a second access address and a second payload placed into the first payload nesting section, the second access address being assigned to a second device, and transmitting the nested data packet to the first device and the second device.

In one embodiment, the present disclosure is directed to a system comprising a transmitter encoder comprising a processor executing instructions in memory to: generate a nested data packet comprising a first access address and a first payload, the first payload comprising a first target payload and a first payload nesting section, the first access address being assigned to a first device, a second access address and a second payload placed into the first payload nesting section; and transmit the nested data packet to the first device and the second device.

In one embodiment, the present disclosure is directed to a method comprising determining a unique target payload for each of a plurality of devices; determining a unique access address for each of the plurality of devices; assembling a nested data packet that comprises at least a synchronization sequence and the unique target payload for each of the plurality of devices; and transmitting the nested data packet to each of the plurality of devices, each of the plurality of devices being configured to detect the unique access address and the unique target payload.

In one embodiment, the present disclosure is directed to a method comprising receiving a nested data packet comprising a plurality of unique access addresses and target payloads, which are arranged in a nested configuration; detecting one of the plurality of unique access addresses; performing a hamming distance calculation for the access address relative to a threshold and an assigned access address; determining if the one of the plurality of unique access addresses is an assigned access address; and obtaining a target payload appearing immediately after the one of the plurality of unique access addresses when the one of the plurality of unique access addresses matches the assigned access address.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

The methods and systems disclosed herein pertain to telecommunications, and more specifically, but not by way of limitation, to systems and methods for communicating with multiple devices. In some embodiments, these communication methods and systems pertain to short-range wireless networks and protocols such as BLUETOOTH, Near-Field Communications (NFC), and the like. To be sure, the multi-device communications disclosed herein are not limited to only short-range wireless communications.

Generally, the methods and systems disclosed herein allow for generating nested data packets that include a data packets intended for a plurality of devices (e.g., user equipment). For example, a first data packet can be nested into the payload of a second data packet. The second data packet can be nested into the payload of a first data packet. Any number of data packets can be combined into a nested data packet. This process is generally referred to as multi-access addressing.

Figures 1, 2:
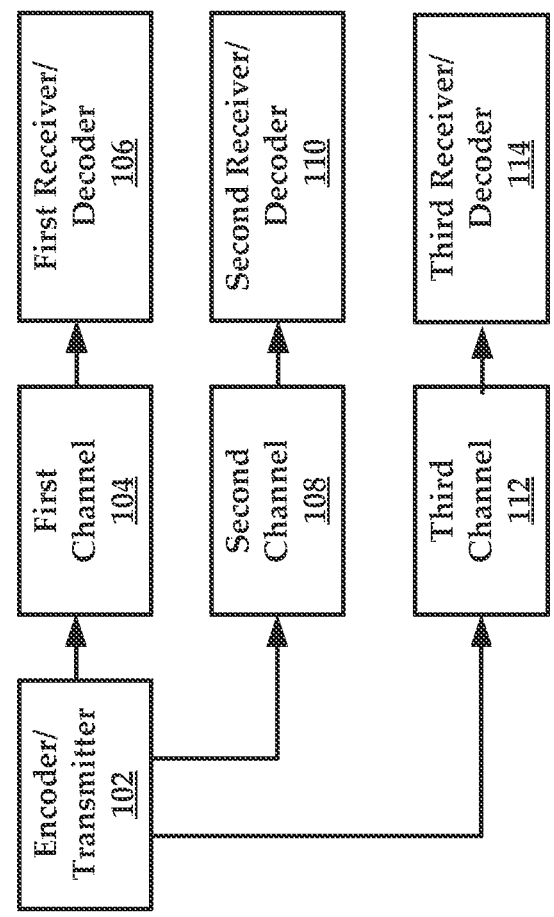
FIG. 1 schematically illustrates an example prior art data packet.
FIG. 2 is a schematic view of an example system of the present disclosure where aspects of the present disclosure may be practiced.

FIG. 1 is a schematic diagram of an example prior art data packet structure. In general, a data packet can have constituent parts such as a preamble that is a bit pattern that is typically used for the RF (radio frequency) to ramp-up. Depending on the implementation it could also be used to estimate frequency offsets, and other RF parameters. The data packet can also have an access address used to detect if this particular packet is meant to be processed by the receiver or not. If the access address is NOT what the receiver is looking for, then it will discard the packet. The data packet can also include a header that informs the first receiver/decoder 106 about the length and type of the packet. The data packet can also have a payload that is the main data component of the packet which is determined by the application. The data packet can also have a CRC (cyclic redundancy code) that allows the receiver/decoder to determine if the packet has errors.

FIG. 2 illustrates an example architecture that can be used to implement aspects of the present disclosure. The architecture can include an encoder/transmitter 102, a first channel 104 and a first receiver/decoder 106, a second channel 108 and second receiver/decoder 110, and a third channel 112 and third receiver/decoder 114. The channels can be any short-range wireless communication link. The encoder/transmitter 102 and the various receiver/decoders are configured to communicate with one another over a channel using a short-range wireless protocol such as BLUETOOTH. To be sure, fewer or more receiver/decoder or encoder/transmitters can be included in the architecture. Moreover, the encoder/transmitter 102 can communicate with each of the receiver/decoders over a single channel.

Figure 3:
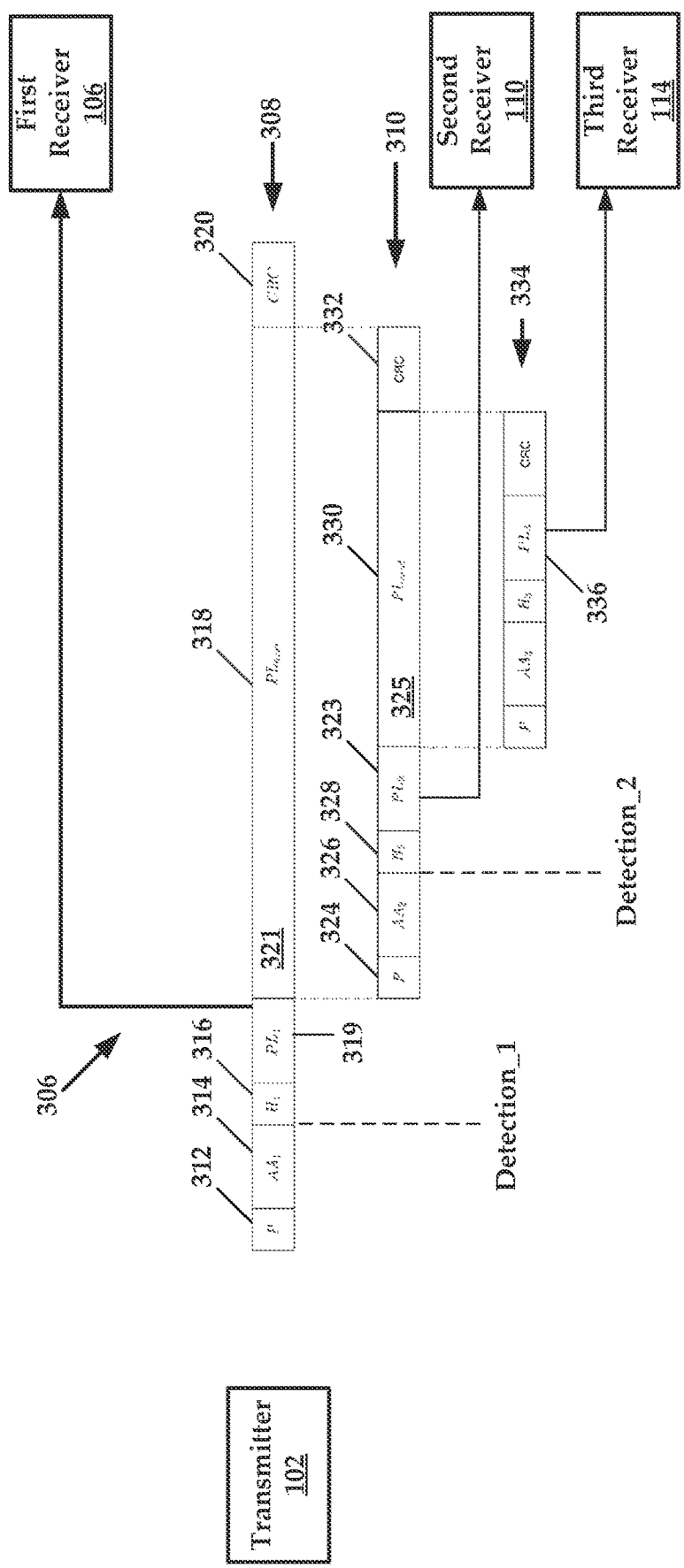
FIG. 3 schematically and diagrammatically illustrates the use of a nested or multi-access address data packet that is used to communicate data to two or more devices.

FIG. 3 illustrates an example nested data packet, referred to also as a multi-AA packet 306. In some embodiments, a multi-AA packet 306 is created by modifying the payload of a typical data packet. For example, the multi-AA packet 306 can be created by modifying a first data packet 308 with a second data packet 310 and a third data packet 334. To be sure, any number of data packets can be nested in this manner.

The first data packet 308 includes a first preamble 312, a first access address 314, a first header 316, a first payload 318, and a first CRC 320. The first preamble 312, first access address 314, and first header 316 may be referred to generally as a first synchronization sequence. The first payload can be separated into a first target payload 319 and a first payload nesting section 321.

A second data packet 310 can be nested within the first payload nesting section 321 of the first data packet 308. For example, the second data packet 310 can be nested into the first payload nesting section 321 of the first data packet 308. The first target payload 319 includes data destined for the first receiver/decoder 106.

As noted above, the synchronization sequence is what a receiver can use to identify a data packet and lock onto the data packet. If the receiver does not detect or acquire the data packet then the data is lost and packet errors are realized.

The second data packet 310 can be nested within the first payload nesting section 321 of the first data packet 308. For example, the second data packet 310 can be nested into the first payload nesting section 321 of the first data packet 308. The first target payload 319 includes data destined for the first receiver/decoder 106.

The second data packet 310 can also include a second preamble 324, a second access address 326, a second header 328, a second payload 330, and a second CRC 332. The second payload 330 can be separated into a second target payload 323 and a second payload nesting section 325. The second target payload 323 includes data destined for the second receiver/decoder 110, and the second payload nesting section 325 includes space for a third data packet 334, as discussed below. The second preamble 324, second access address 326, and second header 328 form a second synchronization sequence.

A third data packet 334 can be nested into the second payload nesting section 325 of the second payload 330 of the second data packet 310 as well. The third data packet 334 has its own payload (third payload 336). To be sure, since the third data packet 334 is the last of the nested packets, the third payload 336 need not be subdivided into a target section and a nesting section.

Structurally, the first synchronization sequence of the first data packet 308 and the first target payload 319 are positioned in front of the second synchronization sequence and second target payload 323 of the second data packet 310. A third synchronization sequence and third payload 336 of the third data packet 334 are located behind the second synchronization sequence and second target payload 323 of the second data packet 310.

The first target payload 319 can be addressed specifically to the first receiver/decoder 106. The second target payload 323 can be addressed specifically to the second receiver/decoder 110, and the third payload 336 can be addressed specifically to the third receiver/decoder 114. That is, the access address information for each packet in the multi-AA packet 306 can designate a unique device. As long as the devices know about each other, they can detect the presence of the other access address to extract their intended payload. Each of the receiver/decoders can receive the entire multi-AA packet and extract only the payload that is addressed to the particular receiver/decoder.

When in a multi-connect mode of operation, a transmitter/encoder can assemble a multi-AA packet based on the number of end point devices. For example, a multi-AA packet can be used to address three devices (first receiver/decoder 106, second receiver/decoder 110, and third receiver/decoder 114) and send each of these devices their intended payload (first target payload 319, second target payload 323, and third payload 336).

In one use case, the first receiver/decoder 106 can receive the packet related to AA_1, which is PL_1+PL_next. However, since PL_next starts with P+AA_2 and since Device_1 knows P and AA_2, it can extract its corresponding payload (PL_1) using a procedure similar to that of FIG. 4 described infra. Similarly, the second receiver/decoder can extract its own corresponding payload (PL_2), by detecting the presence of P+AA_3. It will be understood that in another embodiment, by setting PL_1 and PL_2 to 0, the scheme can be used to transmit the same payload to all three receivers. While these examples have been provided for explanatory purposes, there are also many other variations of the scheme that can be implemented to address payloads to multiple receivers as would be appreciated by one or ordinary skill in the art.

Referring back to FIG. 3, a receiver/decoder, such as the first receiver/decoder 106, can detect an access address a detection point Detection_1. If AA is detected at Detection_1, the receiver processing would end at CRC_1 and the receiver would detect and obtain the first target payload 319. A receiver/decoder, such as the second receiver/decoder 110, can detect an access address a detection point Detection_2. The second receiver/decoder 110 would bypass the data intended for the first receiver/decoder 106.

Detection_1 event can occur when the first receiver/decoder 106 detects the first preamble 312 and the first access address 314. Again, these are known bit sequences to the first receiver/decoder 106. That is, the first preamble 312 and the first access address 314 can include information that is known to the first receiver/decoder 106. When the second receiver/decoder 110 receives the multi-AA packet 306, the second receiver/decoder 110 can bypass or ignore the first preamble 312 and the first access address 314 and acquire the second access address 326 and the second header 328. If found the payload extracted by the second receiver/decoder 110 would include the second target payload 323. Although not shown, a third detection event can be performed by the third receiver/decoder 114.

Figure 4:
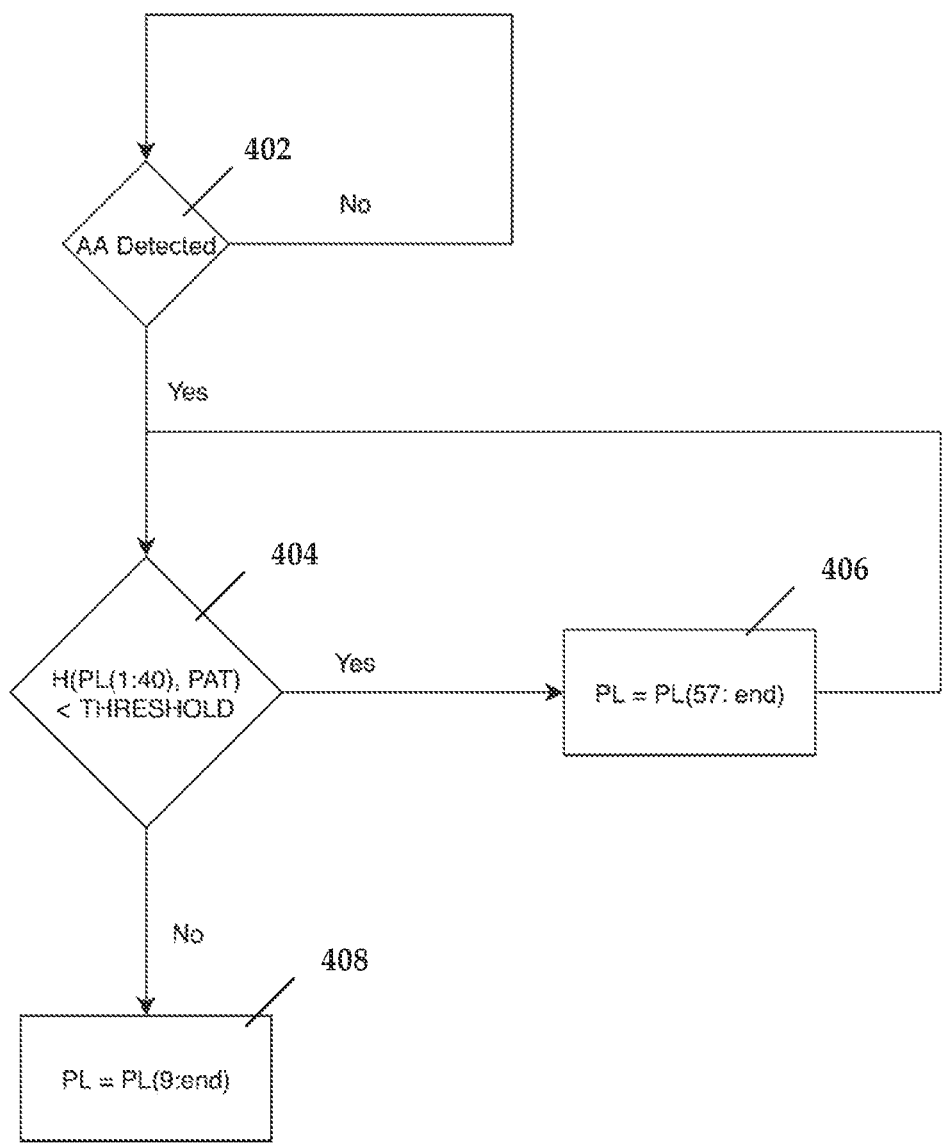
FIG. 4 is a flowchart of an example method of the present disclosure.

FIG. 4 illustrates a flow diagram for a process of extracting a payload, such as a first payload, a second payload, or third payload from a multi-AA packet. In step 402, a determination is made as to whether an access address block has been detected. If not, the process repeats until an access address block is detected. Next, in step 404, a determination is made as to whether Hamming(PL(1:40), PAT)<THRESHOLD. If so, step 406 includes reading the payload from bit 57 to the end of the data packet. If not, the method includes a step 408 of reading from bit nine to the end of the data packet. To be sure, if Hamming(PL(1:40), PAT)<THRESHOLD then Detection_1 has occurred. For example, the first part of the payload (H+P+AA+H1) is discarded. That is, only the bits after H1 are utilized. However, if Hamming (PL(1:40), PAT)<THRESHOLD is NOT true the Detection_2 has happened. For example, the first part of the payload does not need to be discarded, so the H1 can be discarded and the bits after H1 are utilized. These steps can be used to extract any payload from a multi-AA packet.

Figure 5:
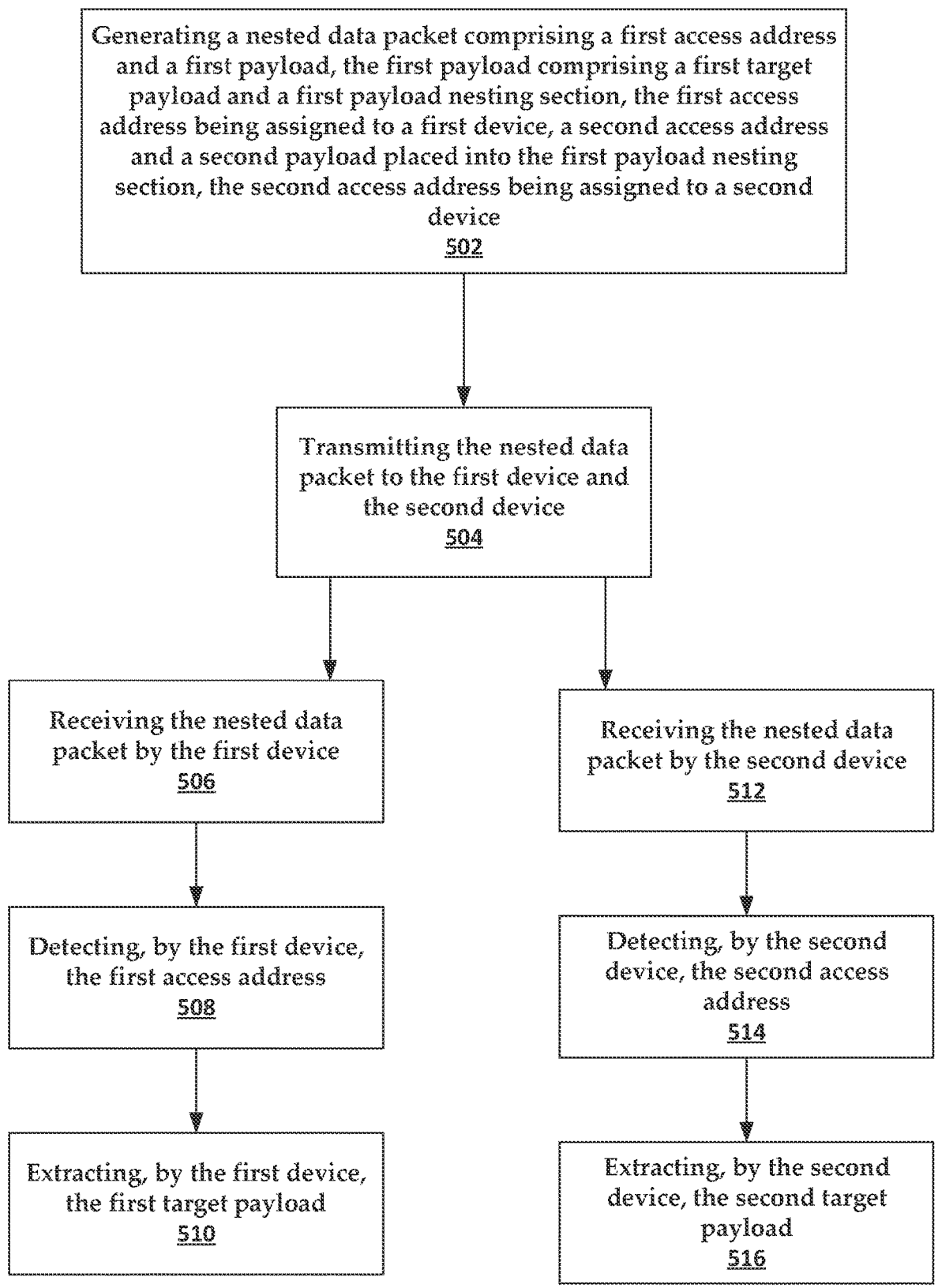
FIG. 5 is a flowchart of another example method of the present disclosure.

FIG. 5 is a flowchart of an example method of the present disclosure. In general, this method can be performed by a transmitter/encoder that has been configured as disclosed herein. This method involves the creation of a nested data packet that has target payloads that are directed to more than one receiver or device.

The method can include a step 502 of generating a nested data packet comprising a first access address and a first payload, the first payload comprising a first target payload and a first payload nesting section, the first access address being assigned to a first device, a second access address and a second payload placed into the first payload nesting section. While this example involves only two decoder/receiver devices, the nested data packet can include data for more than two devices.

The first access address is a unique access address that is known to the first device. In some instances, the transmitter/encoder can share this first access address with the first device prior to transmission of the nested data packet. Likewise, the second access address is a unique access address that is known to the second device. In some instances, the transmitter/encoder can share this second access address with the second device prior to transmission of the nested data packet.

The method can include a step 504 of transmitting the nested data packet to the first device and the second device. That is, both the first and second devices each receive the complete, nested data packet. Each of the decoder/receiver devices can be configured to identify or detect their specific or unique access address in the nested data packet. As noted above, this can be accomplished using a hamming distance calculation. Thus, both the first and second devices can compare (using hamming calculations as an example) their known unique access address to the plurality of access addresses in the nested data packet. When their unique access address is found, prior or upstream data in the nested data packet can be discarded (e.g., access address(es) not belonging to the particular receiver/decoder device) and the unique payload intended for the device can be extracted.

The method can include a step 506 of receiving the nested data packet by the first device, as well as a step 508 of detecting, by the first device, the first access address. The method can also include a step 510 of extracting, by the first device, the first target payload.

The method may include a similar process for the second device. Thus, the method can include a step 512 of receiving the nested data packet by the second device, as well as a step 514 of detecting, by the second device, the second access address. The method can also include a step 516 of extracting, by the second device, the second target payload. Additionally, the method can include bypassing or ignoring, by the second device, the first access address by the second device. As illustrated, the first and second devices can process the nested data packet in parallel (can be done is series as well).

Figure 6:
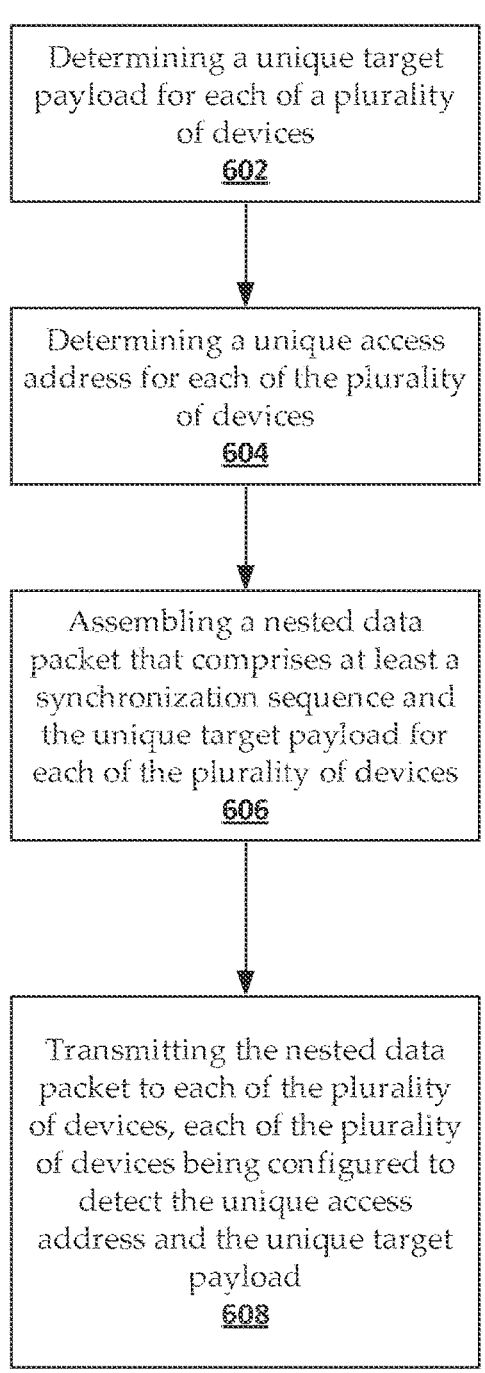
FIG. 6 is a flowchart of yet another example method of the present disclosure.

FIG. 6 is a flowchart of another example method. The method can include a step 602 of determining a unique target payload for each of a plurality of devices. That is, each device is associated with a unique target payload. The method also includes a step 604 of determining a unique access address for each of the plurality of devices.

In some embodiments, the method includes a step 606 of assembling a nested data packet that comprises at least a synchronization sequence and the unique target payload for each of the plurality of devices. The method also includes a step 608 of transmitting the nested data packet to each of the plurality of devices, each of the plurality of devices being configured to detect the unique access address and the unique target payload.

Figure 7:
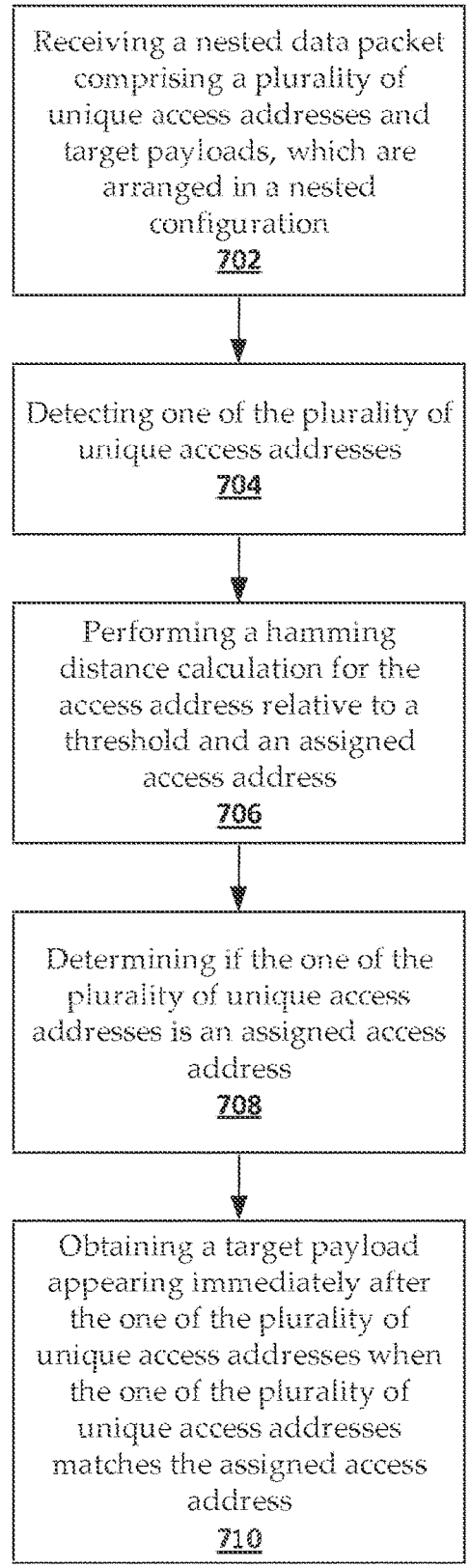
FIG. 7 is a flowchart of an example method of the present disclosure.

FIG. 7 is a flowchart of an additional method related to detecting a unique access address and payload by a particular receiver/decoder. The method can include a step 702 of receiving a nested data packet comprising a plurality of unique access addresses and target payloads, which are arranged in a nested configuration. Next, the method includes a step 704 of detecting one of the plurality of unique access addresses. Once an access address is encountered, the method can include a step 706 of performing a hamming distance calculation for the access address relative to a threshold. This allows a receiver/decoder to compare their stored access address information to the detected access address to determine if it is the access address assigned to the device or to another device. Thus, the method includes a step 708 of determining which one of the plurality of unique access addresses has been detected based on the hamming distance calculation. Again, the comparison is made between the unique access address known to the receiver/decoder and the access address that has been encountered in the nested data packet. Next, the method includes a step 710 of obtaining a target payload appearing immediately after the one of the plurality of unique access addresses when the one of the plurality of unique access addresses matches the assigned access address When the access address that has been encountered matches the access address known or assigned to the device, the target payload that is immediately after the access address is the target or intended payload for the device.

In one use case, an example encoder/transmitter could include a Smartphone or other similar device that is configured to transmit media, such as audio or video to a receiver/decoder. As noted, the encoder can transmit data on a link to the decoder, where the link is a short-range wireless connection (other connections, including long-range wireless or wired connections can also be used). The decoder can include a pair of wireless earbuds. Each of the wireless earbuds can be assigned a particular access address by the encoder. These access addresses can be exchanged when the earbuds are paired with the Smartphone.

The encoder can generate a nested data packet with first payload destined for a first one of the earbuds and a second payload destined for a second one of the earbuds. The encoder transmits the nested data packet to each of the earbuds. Using the methods disclosed herein, the earbuds can identify their unique access address and associated target payload. In one example, the first payload could include a first music track and the second payload could include a second music track that is different from the first music track. A first user could wear the first earbud and a second user could wear the second earbud, allowing a single pair of earbuds to be used by two different users. Each of the users can listen to a different track. That is, the first user can listen to the first music track on the first earbud and the second user can listen to the second music track on the second earbud. To be sure, this is non-limiting example, however, the present disclosure contemplates being able to send multiple distinct payloads to multiple distinct devices using a single, nested data packet or stream of nested data packets.

Figure 8:
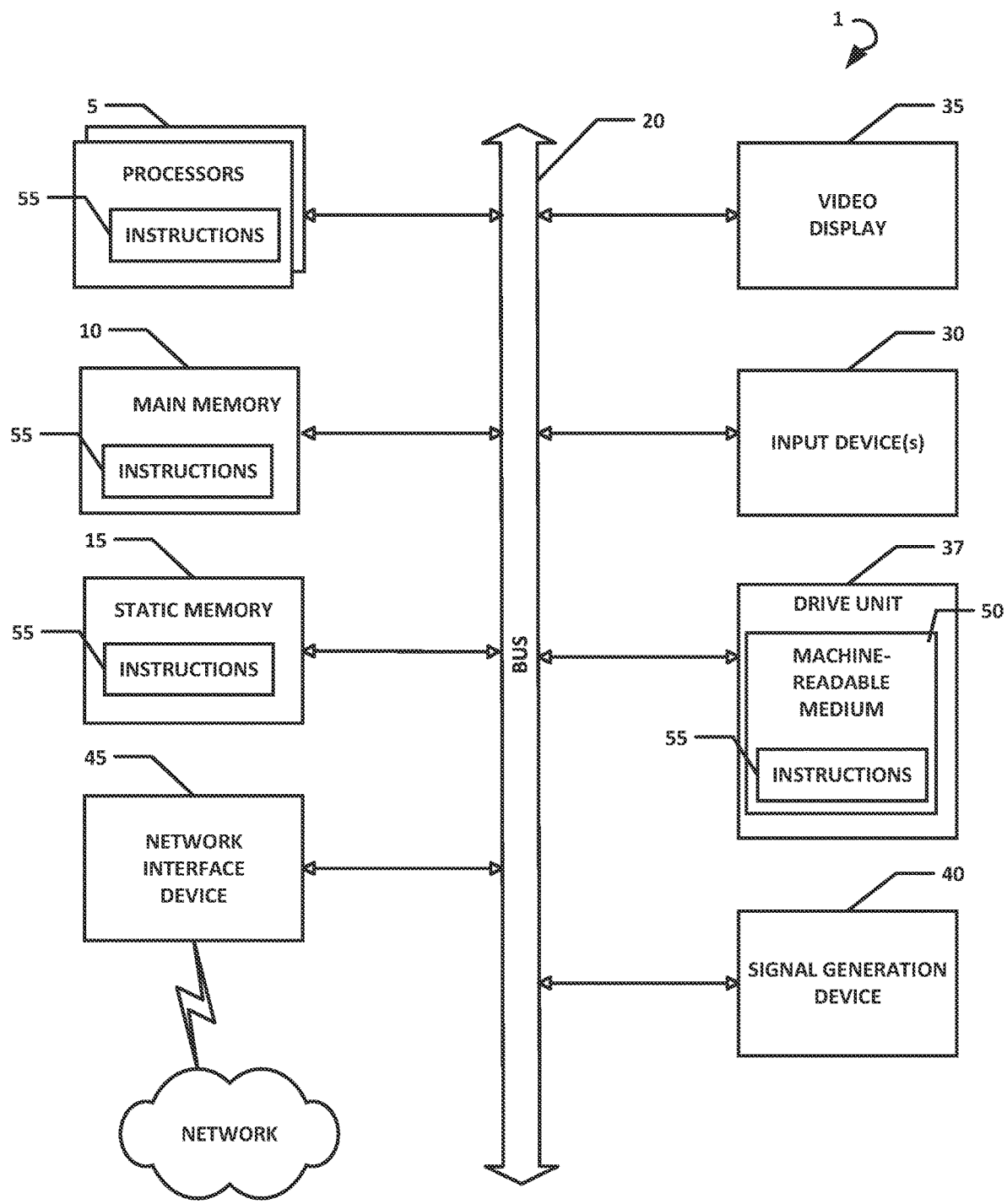
FIG. 8 is a simplified block diagram of a computing system, in accordance with some embodiments.

FIG. 8 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be an Internet-of-Things (IoT) device or system, personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method comprising:
generating a nested data packet comprising a first access address and a first payload, the first payload comprising a first target payload and a first payload nesting section, the first access address being assigned to a first device, a second access address and a second payload placed into the first payload nesting section, the second access address being assigned to a second device; and
transmitting the nested data packet to the first device and the second device.

2. The method according to claim 1, further comprising:
receiving the nested data packet by the first device;
detecting, by the first device, the first access address; and
extracting, by the first device, the first target payload.

3. The method according to claim 2, further comprising:
receiving the nested data packet by the second device;
detecting, by the second device, the second access address; and
extracting, by the second device, a second target payload included in the second payload.

4. The method according to claim 3, further comprising bypassing or ignoring, by the second device, the first access address.

5. The method of claim 3, wherein the first device and the second device process the nested data packet in parallel.

6. The method of claim 3, wherein the first device and the second device process the nested data packet in series.

7. The method according to claim 1, wherein the first access address, a first preamble, and a first header comprise a first synchronization sequence.

8. The method according to claim 1, wherein second first access address, a second preamble, and a second header comprise a second synchronization sequence.

9. The method according to claim 1, further comprising attaching an error correction block to each of the first payload and the second payload.

10. The method according to claim 1, further comprising nesting additional payloads designated for additional devices into the nested data packet.

11. The method according to claim 1, wherein the first access address, a first preamble, and a first header comprise a first synchronization sequence and the second access address, a second preamble, and a second header comprise a second synchronization sequence.

12. A system comprising:
a transmitter encoder comprising a processor executing instructions in memory to:
generate a nested data packet comprising a first access address and a first payload, the first payload comprising a first target payload and a first payload nesting section, the first access address being assigned to a first device, a second access address and a second payload placed into the first payload nesting section, the second access address being assigned to a second device; and
transmit the nested data packet to the first device and the second device.

13. The system according to claim 12, further comprising the first device that is configured to:
receive the nested data packet by the first device;
detect the first access address; and
extract the first target payload.

14. The system according to claim 13, wherein the transmitter encoder is configured to assemble a second synchronization sequence comprising the second access address, a second preamble, and a second header.

15. The system according to claim 12, further comprising the second device that is configured to:
receive the nested data packet by the second device;
detect the second access address; and
extract a second target payload from the second payload.

16. The system according to claim 15, wherein the second device is configured to bypass or ignore the first access address when searching for the second access address.

17. The system of claim 15, wherein the first device and the second device process the nested data packet in parallel.

18. The system of claim 15, wherein the first device and the second device process the nested data packet in series.

19. The system according to claim 12, wherein the transmitter encoder is configured to assemble a first synchronization sequence comprising the first access address, a first preamble, and a first header.

20. The system according to claim 12, wherein the transmitter encoder is configured to attach an error correction block to each of the first payload and the second payload.

21. The system according to claim 12, wherein the transmitter encoder is configured to nest additional payloads designated for additional devices into the nested data packet.

* * * * *